Jan. 14, 1964   S. C. POLLOCK ETAL   3,117,727
VEHICLE HEADLIGHT WASHER SYSTEM
Filed July 28, 1961   2 Sheets-Sheet 1
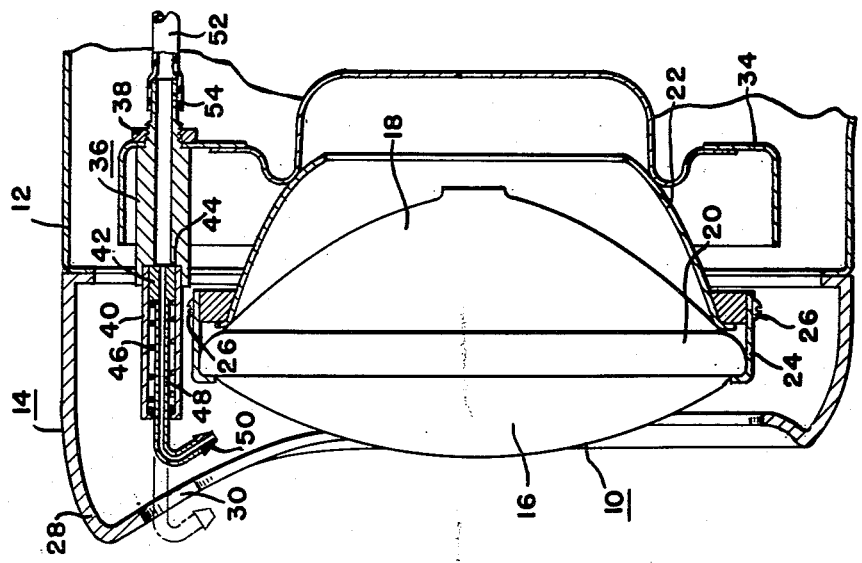
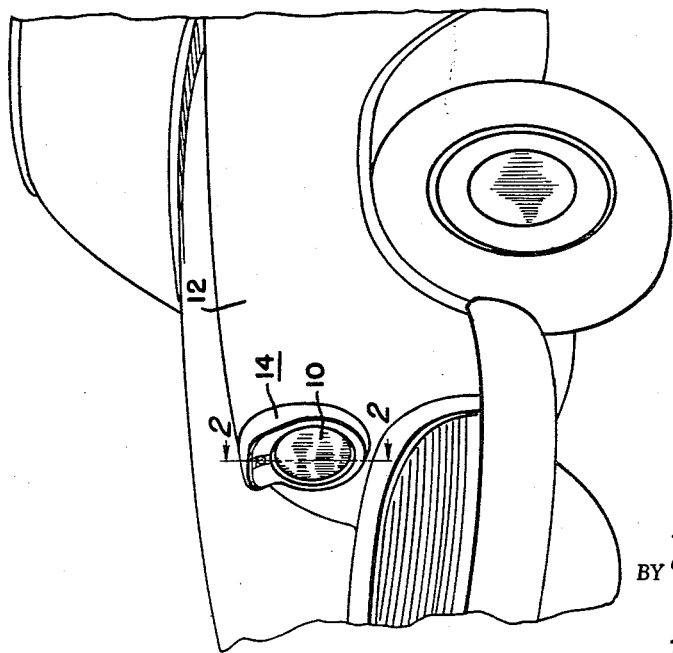
INVENTORS
Samuel C. Pollock
BY John W. Yee
*Their Attorney*

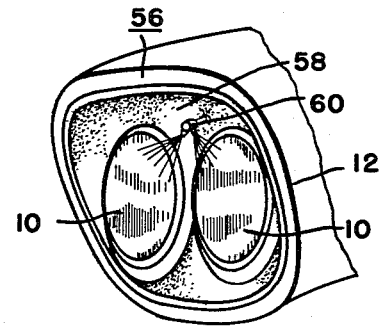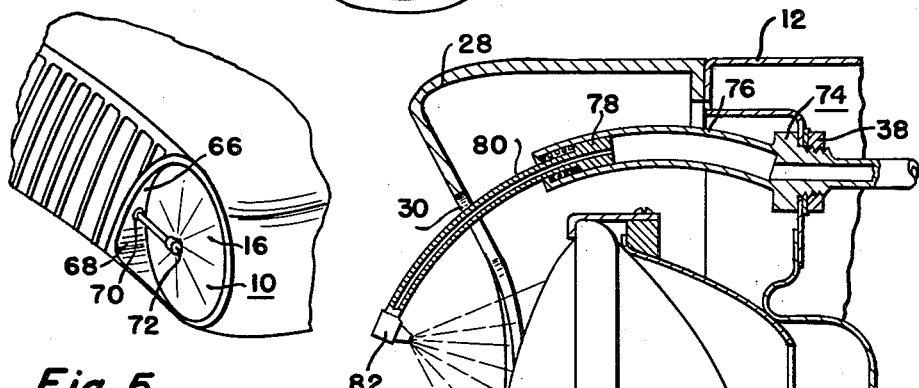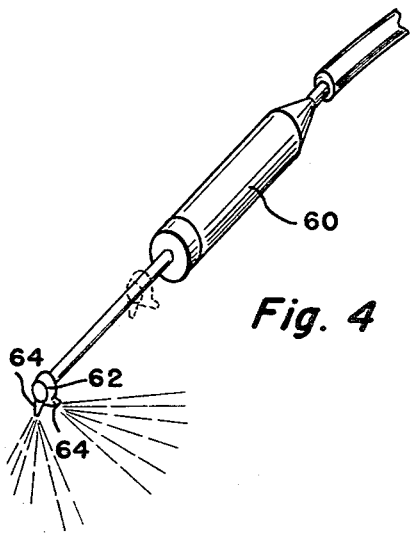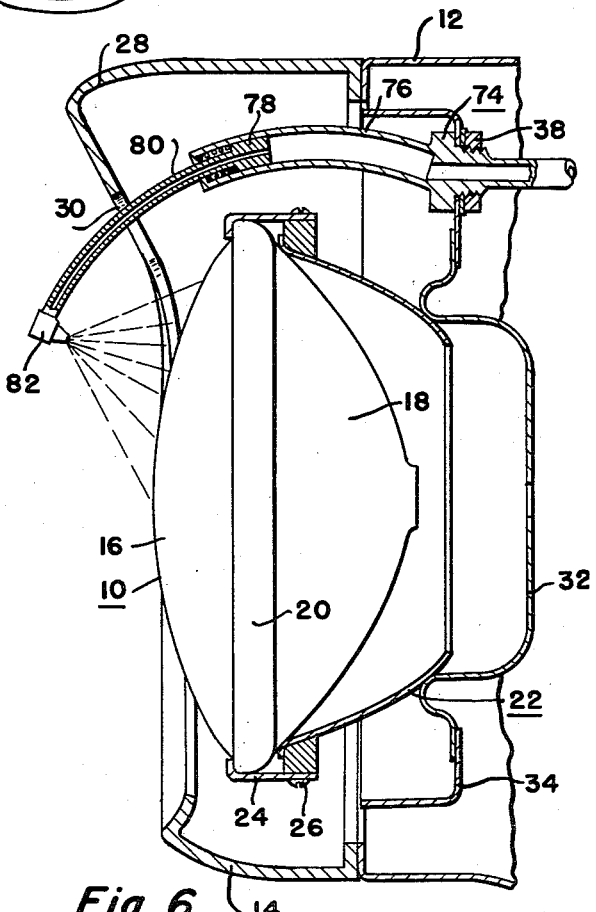

United States Patent Office 3,117,727
Patented Jan. 14, 1964

3,117,727
VEHICLE HEADLIGHT WASHER SYSTEM
Samuel C. Pollock, Rochester, and John W. Yee, Roseville, Mich., assignors to General Motors Corporation, Detroit, Mich., a corporation of Delaware
Filed July 28, 1961, Ser. No. 127,611
9 Claims. (Cl. 240—7.1)

This invention pertains to motor vehicles, and particularly to pressure operated washer systems for vehicle headlights.

It is well recognized that the lenses of vevhicle headlights become covered with dirt and road grime when a vehicle is driven on wet roads. This dirt and grime appreciably reduces the effective intensity of the light beams, and accordingly seriously impairs vision during night driving. The present invention relates to means for discharging the liquid solvent under pressure against the outer surfaces of headlight lenses so as to remove the illumination obscuring material which collects thereon during movement of the vehicle. Accordingly, among our objects are the provision of a pressure operated washer system for vehicle headlights; the further provision of a vehicle headlight washer system including extensible and retractable nozzle means; and the still furthr provision of a vehicle headlight washer system including unitary nozzle means for spraying liquid solvent onto the lenses of a pair of headlights in a dual headlight arrangement.

The aforementioned and other objects are accomplished in the present invention by attaching the nozzle means to a reciprocable piston disposed within a cylinder having spring means for normally retracting the piston and nozzle means, the piston being movable under hydrostatic pressure to extend the nozzle means for spraying the liquid solvent onto a headlight lens from a position forwardly thereof. Specifically, the piston carried extensible and retractable nozzle means may be arranged substantially with the ornamental headlight bezel so that when it is not in use, it is substantially concealed from view. Liquid solvent may be supplied to the nozzle means by a pump, or from an aerosol type disposable container.

In one embodiment the piston is mounted for rectilinear movement with respect to its cylinder, with the nozzle means being extensible to a position forward and above the rim of the headlight so that substantially the entire partially spherical surface of the headlight lens will be cleaned by the liquid solvent upon delivery thereof. In a second embodiment the piston and cylinder are of generally arcuate configuration whereby the nozzle means will move in an arcuate path and thus be arranged both forwardly and directly in front of the upper portion of the headlight lens during pressure actuation thereof. In a third embodiment, the nozzle means is disposed on one side of the headlight so as to be extensible to a position in front of and in substantial alignment with the center of the headlight lens. In a dual headlight installation, single extensible and retractable nozzle means having angularly offset spray orifices directed towards each headlight may be mounted between the two headlights.

In all embodiments the liquid solvent is supplied under pressure to the nozzle means for initially extending the same to a position forward and/or in front of the headlight lens. The liquid solvent is then discharged onto the outer surface of the headlight lens for a predetermined time interval so as to remove the dirt and other grime which has been deposited thereon. Any conventional type of timer operated switch can be used to determine the interval during which liquid solvent is delivered to the nozzle means. At the conclusion of the washing cycle, the spring retracts the nozzle means to a position within the headlight bezel so as to substantially conceal the same from view.

Further objects and advantages of the present invention will be apparent from the following description, reference being had to the accompanying drawings, wherein preferred embodiments of the present invention are clearly shown, and wherein like numerals depict like parts throughout the several views.

In the drawings:

FIGURE 1 is a fragmentary view of a vehicle embodying the headlight washer system of this invention.

FIGURE 2 is a fragmentary view, partly in section and partly in elevation, taken along line 2—2 of FIGURE 1, of one embodiment of the extensible and retractable headlight washer nozzle.

FIGURE 3 is a fragmentary view, in elevation, of a dual headlight washer installation.

FIGURE 4 is a fragmentary isometric view of the nozzle means used in the dual headlight installation of FIGURE 3.

FIGURE 5 is a fragmentary view, in elevation of a modified headlight washer system.

FIGURE 6 is a view, partly in section and partly in elevation, of a further modified headlight washer system.

With reference to FIGURE 1, a portion of a motor vehicle is shown having a headlight 10 mounted in a fender 12, it being understood that a similar headlight is mounted in the fender on the opposite side of the vehicle. The headlight 10 is surrounded by an ornamental bezel 14 suitably attached to the fender 12.

With reference to FIGURE 2, the headlight 10 includes a partially spherical lens 16 and a reflector housing 18 having a mounting flange, or rim, 20. The headlight 10 is mounted within a mounting ring assembly 22 by means of an annular retainer 24 suitably attached to the mounting ring assembly 22 by screws 26. The ornamental bezel 14 surrounds the headlight and has a protruding upper hood portion 28 with a slot 30 therein.

The mounting ring assembly 22 for supporting the headlight 10 is carried by a bracket 32 disposed within the fender 12. The bracket 32 is in turn attached to a ring 34 which encircles the headlight mounting ring assembly and has a washer nozzle assembly 36 attached thereto by a nut 38. The nozzle assembly includes a cylinder 40 having a centrally apertured reciprocable piston 42 disposed therein and normally held in engagement with a shoulder 44 by a compression spring 46. The compression spring 46 encircles the integral hollow rod 48 attached to the piston and projecting from the end of the cylinder. As seen in FIGURE 2 the hollow rod 48 has a hooked, or downwardly curved, end with a spray nozzle 50 attached thereto.

A supply conduit 52 is suitably attached to a fitting 54 on the end of the nozzle assembly 36 and through which liquid solvent can be supplied by a pump from a reservoir, or from an aerosol type container, not shown. The liquid solvent is delivered under pressure for a predetermined time interval, for example five seconds, as controlled by a timer of any well known type, not shown. It is to be noted that since the orifices of the spray nozzles 50 are of appreciably smaller diameter than the diameter of the conduit 52, a build up of hydrostatic pressure will occur within the cylinder 40 to effect movement of the piston 42 upon delivery of liquid solvent thereto. Accordingly, when liquid solvent is supplied to the nozzle assembly 36 through conduit 52 the piston 42 will move from the full line position of FIGURE 2 to the dotted line position of FIGURE 2, and simultaneously therewith liquid solvent will be discharged from the nozzle 50 onto the outer surface of the headlight lens 16. It will be appreciated that the liquid solvent spray is more effective when the nozzle is projected to a position forward of the headlight lens in that substantially the entire area of the lens will have high pressure liquid solvent sprayed thereon.

With reference to FIGURES 3 and 4, a washer system for a dual headlight installation will be described. In this installation the dual headlights 10 are mounted within a vehicle fender 12 and surrounded by a common bezel 56 having a decorative inner portion 58 with openings through which the headlights 10 project. In this embodiment a single extensible and retractable nozzle assembly 60 is disposed above and between the two headlights 10 for simultaneously spraying liquid solvent onto the lenses of both headlights. As seen particularly in FIGURE 4 this can conveniently be accomplished by attaching a spray nozzle 62 to the piston rod having a pair of angularly offset spray heads 64 for discharging solvent onto the spaced headlights 10. In all other respects the nozzle assembly 60 is identical to that described in connection with the embodiment of FIGURE 2 in that the piston thereof is automatically retracted by a spring when the pressure is relieved to the dotted line position shown in FIGURE 4 and automatically extended to the full line position of FIGURE 4 when hydrostatic pressure is supplied thereto.

With reference to FIGURE 5, a modified embodiment is shown wherein a bezel 66 having a protruding side portion 68 surrounds the headlight 10. The side portion 68 of the bezel 66 has an opening 70 through which a spray nozzle 72 is extensible to a position in front of and in substantial alignment with the center of the headlight lens 16. The nozzle assembly of the embodiment of FIGURE 5 may be of the type shown in FIGURE 4 except for the spray head.

With reference to FIGURE 6, another embodiment is shown including a washer nozzle assembly 74 having an arcuate cylinder 76 within which an arcuate piston 78 having an arcuate hollow piston rod 80 is disposed. By forming the cylinder 76 and piston 78 of arcuate configuration, it can be seen that the spray nozzle 82 will be moved both downwardly and forwardly with respect to the headlight during extension thereof. In this manner the spray nozzle 82 will be directly in front of the headlight lens 16 when the liquid solvent is discharged therefrom. When the pressure is relieved, the compression spring 84 will retract the piston and nozzle to a concealed position underneath the hood 28 of the bezel 14.

While the embodiments of the invention as herein disclosed constitute a preferred form, it is to be understood that other forms might be adopted.

What is claimed is as follows:

1. In a vehicle, a headlight mounted in said vehicle having a lens, a bezel having an opening therein surrounding said headlight, and movable nozzle means normally disposed substantially within said bezel adjacent said opening and extensible under hydrostatic pressure through said opening to a position forward of said lens and outside of said bezel for spraying liquid solvent under pressure onto the outer surface of said headlight lens to clean the same.

2. In a vehicle, a headlight mounted in said vehicle and having a lens, a bezel having an opening therein surrounding said headlight, nozzle means disposed substantially within said bezel adjacent said opening and extensible under hydrostatic pressure through said opening to a position forward of said headlight lens for spraying liquid solvent under pressure onto said lens to clean the same, and means operable to retract said nozzle means when the hydrostatic pressure is relieved.

3. In a vehicle, a headlight, a mounting ring assembly supporting said headlight on said vehicle, bracket means attached to said mounting ring assembly, a bezel having an opening therein surrounding said headlight and attached to said vehicle, a nozzle assembly carried by said bracket means and normally disposed substantially within said bezel adjacent said opening so as to be substantially concealed from view, said nozzle assembly including a cylinder having a reciprocable piston therein and carrying a spray nozzle, said piston being movable to an extended position under the urge of hydrostatic pressure in said cylinder and moving said spray nozzle through said opening to a position outside of said bezel and forwardly of the headlight lens for discharging liquid solvent under pressure thereon to clean said lens, and means operable to retract said piston when the hydrostatic pressure in said cylinder is relieved.

4. In a vehicle, a headlight assembly mounted in said vehicle, a bezel attached to said vehicle and having an opening therein surrounding said headlight assembly, a washer nozzle assembly mounted in said vehicle proximate said headlight assembly and substantially within said bezel adjacent said opening, said washer nozzle assembly including a cylinder having a movable piston disposed therein carrying a spray nozzle, said piston being movable under the urge of hydrostatic pressure within said cylinder and extending said spray nozzle through said opening to a position outside of said bezel and forward of said headlight assembly for spraying liquid solvent under pressure thereon, and resilient means disposed within said cylinder for retracting said piston and said spray nozzle when the hydrostatic pressure is relieved.

5. The combination set forth in claim 4 wherein said washer nozzle assembly is located above said headlight assembly and wherein said piston is movable in a rectilinear path, said piston having a hollow rod attached thereto and extending from said cylinder with a downwardly curved end, the spray nozzle being attached to the downwardly curved end of said piston rod.

6. The combination set forth in claim 4 wherein said headlight assembly comprises dual headlights, and wherein said washer nozzle assembly is disposed above and between said dual headlights.

7. The combination set forth in claim 6 wherein said spray nozzle has at least two angularly offset orifices for simultaneously spraying liquid solvent under pressure onto both headlights.

8. The combination set forth in claim 4 wherein said washer nozzle assembly is located on one side of said headlight and extensible to a position where said spray nozzle is in front of and in substantial alignment with the center of said headlight.

9. The combination set forth in claim 4 wherein said cylinder and piston are of arcuate configuration and are normally located above said headlight, said piston including an arcuate hollow piston rod carrying said spray nozzle which is extensible to a position forwardly and directly in front of said headlight.

References Cited in the file of this patent

UNITED STATES PATENTS

| | | |
|---|---|---|
| 2,288,429 | Baughn | June 30, 1942 |
| 2,772,115 | Stanley | Nov. 27, 1956 |
| 2,939,249 | Siebenthal et al. | June 7, 1960 |
| 3,017,120 | Friant et al. | Jan. 16, 1962 |